(12) United States Patent
Xu et al.

(10) Patent No.: US 10,663,341 B2
(45) Date of Patent: May 26, 2020

(54) WEIGHING METHOD OF TOUCHSCREEN TERMINAL, AND TOUCHSCREEN TERMINAL

(71) Applicant: HUAWEI TECHNOLOGIES CO., LTD., Guangdong (CN)

(72) Inventors: Jie Xu, Guangdong (CN); Feng Dong, Guangdong (CN); Hao Wu, Guangdong (CN); Hang Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 15/741,628

(22) PCT Filed: Jul. 3, 2015

(86) PCT No.: PCT/CN2015/083332
§ 371 (c)(1),
(2) Date: Jan. 3, 2018

(87) PCT Pub. No.: WO2017/004756
PCT Pub. Date: Jan. 12, 2017

(65) Prior Publication Data
US 2018/0195892 A1 Jul. 12, 2018

(51) Int. Cl.
*G01G 19/56* (2006.01)
*G01G 7/06* (2006.01)
(Continued)

(52) U.S. Cl.
CPC ............... *G01G 3/12* (2013.01); *G01G 7/06* (2013.01); *G01G 19/52* (2013.01); *G01G 19/56* (2013.01); *G06F 3/044* (2013.01)

(58) Field of Classification Search
CPC .......... G01G 3/12; G01G 19/52; G01G 19/56; G01G 7/06; G06F 3/044
(Continued)

(56) References Cited

U.S. PATENT DOCUMENTS 6,075,520 A 6/2000 Inoue et al.
2011/0298742 A1 12/2011 Dingnan et al.
(Continued)

FOREIGN PATENT DOCUMENTS

CN 1964386 A 5/2007
CN 201207661 Y 3/2009
(Continued)

OTHER PUBLICATIONS

International Search Report in International Application No. PCT/CN2015/083332, dated Mar. 29, 2016, 7 pages.
(Continued)

*Primary Examiner* — Jacques M Saint Surin
(74) *Attorney, Agent, or Firm* — Fish & Richardson P.C.

(57) ABSTRACT

Embodiments of the present invention provide a weighing method of a touchscreen terminal, and a touchscreen terminal. When a to-be-weighed object is placed in a preset area of a touchscreen of a touchscreen terminal, a reported first capacitance value and reported coordinates of a compensation point are obtained. The first capacitance value is compensated according to a compensation relationship, the coordinates of the compensation point, and the first capacitance value to obtain a second capacitance value. In this way, no additional external structure is needed for the touchscreen terminal, making the touchscreen terminal convenient to carry.

17 Claims, 5 Drawing Sheets

(51) Int. Cl.
*G01G 19/52* (2006.01)
*G06F 3/044* (2006.01)
*G01G 3/12* (2006.01)

(58) Field of Classification Search
USPC .............................................................. 177/1
See application file for complete search history.

(56) References Cited

U.S. PATENT DOCUMENTS

| | | |
|---|---|---|
| 2012/0215486 A1 | 8/2012 | Lin et al. |
| 2014/0015777 A1 | 1/2014 | Park et al. |
| 2014/0089231 A1 | 3/2014 | Jhunja et al. |
| 2014/0105355 A1* | 4/2014 | Toimela .................. A61N 5/103 378/41 |
| 2014/0125620 A1* | 5/2014 | Panther .................. G06F 3/011 345/173 |
| 2014/0160038 A1* | 6/2014 | Lee ....................... G06F 3/0418 345/173 |
| 2015/0168205 A1 | 6/2015 | Lee |
| 2016/0188069 A1* | 6/2016 | Tao ....................... G06F 3/0414 345/173 |

FOREIGN PATENT DOCUMENTS

| | | |
|---|---|---|
| CN | 101539815 A | 9/2009 |
| CN | 201430626 Y | 3/2010 |
| CN | 101692680 A | 4/2010 |
| CN | 201601720 U | 10/2010 |
| CN | 101977261 A | 2/2011 |
| CN | 102394969 A | 3/2012 |
| CN | 102564537 A | 7/2012 |
| CN | 102739859 A | 10/2012 |
| CN | 203327100 U | 12/2013 |
| CN | 103942477 A | 7/2014 |
| CN | 103986807 A | 8/2014 |
| CN | 104168349 A | 11/2014 |
| CN | 104407752 A | 3/2015 |
| CN | 104655241 A | 5/2015 |
| JP | 2004061478 A | 2/2004 |

OTHER PUBLICATIONS

Office Action issued in Chinese Application No. 201580081022.8 dated Mar. 21, 2019, 6 pages.
Extended European Search Report issued in European Application No. 15897412.1 dated Jun. 11, 2018, 10 pages.

* cited by examiner

WEIGHING METHOD OF TOUCHSCREEN TERMINAL, AND TOUCHSCREEN TERMINAL

CROSS-REFERENCE TO RELATED APPLICATIONS

This application is a National Stage of International Application No. PCT/CN2015/083332, filed on Jul. 3, 2015, which is hereby incorporated by reference in its entirety.

TECHNICAL FIELD

Embodiments of the present invention relate to communications technologies, and in particular, to a weighing method of a touchscreen terminal, and a touchscreen terminal.

BACKGROUND

Touchscreen terminals have increasingly become necessities in people's life for their advantages such as ease of operation and intelligent human-machine interaction. There is also an ever increasing demand for functions of the touchscreen terminals. Adding a weighing function to a touchscreen terminal brings great convenience to people's life.

A mobile phone is used as an example of the touchscreen terminal. In the prior art, an electronic scale module is disposed inside the mobile phone, a hook is disposed at the bottom of a phone housing, and there is a signal connection between the hook and the electronic scale module. In practice, a to-be-weighed object is hung onto the hook and then the mobile phone is held by hand to lift the to-be-weighed object. A weight of the to-be-weighed object is learned by using a gravity sensor of the electronic scale module, and the weight is displayed on a phone screen.

However, to use the prior-art method, an external hook needs to be attached to a touchscreen terminal. This makes the touchscreen terminal inconvenient to carry.

SUMMARY

Embodiments of the present invention provide a weighing method of a touchscreen terminal, and a touchscreen terminal. No additional external structure is needed for the touchscreen terminal, making the touchscreen terminal convenient to carry.

According to a first aspect, an embodiment of the present invention provides a weighing method of a touchscreen terminal, where when a to-be-weighed object is placed in a preset area of a touchscreen of the touchscreen terminal, the method includes:

obtaining a reported first capacitance value and reported coordinates of a compensation point;

compensating the first capacitance value according to a compensation relationship, the coordinates of the compensation point, and the first capacitance value to obtain a second capacitance value, where the compensation relationship enables differences between capacitance values obtained after capacitance values at all points under a same pressure in the preset area of the touchscreen are compensated by using the compensation relationship to fall within a preset error range; and obtaining, according to a correspondence between the second capacitance value and a weight, the weight corresponding to the second capacitance value.

With reference to the first aspect, in a first possible implementation manner of the first aspect, when the to-be-weighed object touches the touchscreen at one point, the compensation point is the touch point;

when the to-be-weighed object touches the touchscreen at two points, the compensation point is a midpoint of a line segment connecting the two points; and when the to-be-weighed object touches the touchscreen at at least three points, the compensation point is a center of gravity of a graph enclosed by the at least three points.

With reference to the first aspect or the first possible implementation manner of the first aspect, in a second possible implementation manner of the first aspect, before the compensating the first capacitance value according to a compensation relationship, the coordinates of the compensation point, and the first capacitance value to obtain a second capacitance value, the method further includes:

obtaining a capacitance value at each point under a same preset pressure in the preset area of the touchscreen; and obtaining the compensation relationship according to coordinate values of each point and the capacitance value at each point under the same preset pressure.

With reference to the first aspect or the first possible implementation manner or the second possible implementation manner of the first aspect, in a third possible implementation manner of the first aspect, the obtaining, according to a correspondence between the second capacitance value and a weight, the weight corresponding to the second capacitance value includes:

obtaining, according to a correspondence between the second capacitance value and a pressure, the pressure corresponding to the second capacitance value; and obtaining, according to a correspondence between the pressure and a weight, the weight corresponding to the pressure.

With reference to the third possible implementation manner of the first aspect, in a fourth possible implementation manner of the first aspect, before the obtaining, according to a correspondence between the pressure and a weight, the weight corresponding to the pressure, the method further includes:

obtaining a pressure that is corresponding to a second capacitance value and that is reported when a weight-known object is placed in the preset area of the touchscreen; and determining correspondences between pressures and weights according to pressures respectively corresponding to N different weight-known objects.

With reference to any one of the first aspect or the first possible implementation manner to the fourth possible implementation manner of the first aspect, in a fifth possible implementation manner of the first aspect, the preset error range is from 0 to 20% of a maximum value.

According to a second aspect, an embodiment of the present invention provides a touchscreen terminal, including:

a touchscreen, where a preset area of the touchscreen is configured for placing a to-be-weighed object;

an obtaining module, configured to obtain a reported first capacitance value and reported coordinates of a compensation point; and a processing module, configured to compensate the first capacitance value according to a compensation relationship, the coordinates of the compensation point, and the first capacitance value to obtain a second capacitance value, where the compensation relationship enables differences between capacitance values obtained after capacitance values at all points under a same pressure in the preset area of the touchscreen are compensated by using the compensation relationship to fall within a preset error range, where the processing module is further configured to obtain, according to a correspondence between the second capacitance value and a weight, the weight corresponding to the second capacitance value.

With reference to the second aspect, in a first possible implementation manner of the second aspect, when the to-be-weighed object touches the touchscreen at one point, the compensation point is the touch point;

when the to-be-weighed object touches the touchscreen at two points, the compensation point is a midpoint of a line segment connecting the two points; and when the to-be-weighed object touches the touchscreen at at least three points, the compensation point is a center of gravity of a graph enclosed by the at least three points.

With reference to the second aspect or the first possible implementation manner of the second aspect, in a second possible implementation manner of the second aspect, the obtaining module is further configured to obtain a capacitance value at each point under a same preset pressure in the preset area of the touchscreen; and the processing module is further configured to obtain the compensation relationship according to coordinate values of each point and the capacitance value at each point under the same preset pressure.

With reference to the second aspect or the first possible implementation manner or the second possible implementation manner of the second aspect, in a third possible implementation manner of the second aspect, the processing module is specifically configured to: obtain, according to a correspondence between the second capacitance value and a pressure, the pressure corresponding to the second capacitance value; and obtain, according to a correspondence between the pressure and a weight, the weight corresponding to the pressure.

With reference to the third possible implementation manner of the second aspect, in a fourth possible implementation manner of the second aspect, the processing module is further configured to: obtain a pressure that is corresponding to a second capacitance value and that is reported when a weight-known object is placed in the preset area of the touchscreen; and determine correspondences between pressures and weights according to pressures respectively corresponding to N different weight-known objects.

With reference to any one of the second aspect or the first possible implementation manner to the fourth possible implementation manner of the second aspect, in a fifth possible implementation manner of the second aspect, the preset error range is from 0 to 20% of a maximum value.

According to the weighing method of a touchscreen terminal and the touchscreen terminal provided in the embodiments of the present invention, when a to-be-weighed object is placed in a preset area of a touchscreen of a touchscreen terminal, a reported first capacitance value and reported coordinates of a compensation point are obtained; the first capacitance value is compensated according to a compensation relationship, the coordinates of the compensation point, and the first capacitance value to obtain a second capacitance value; and a weight corresponding to the second capacitance value is obtained according to a correspondence between the second capacitance value and the weight. When the to-be-weighed object is placed in the preset area of the touchscreen, the touchscreen is distorted, and specifically, a gap between a housing and a capacitive screen of the touchscreen is distorted, resulting in a change in the capacitance value at the compensation point of the touchscreen. The capacitance value of the touchscreen is compensated according to the compensation relationship, and the weight of the to-be-weighed object is obtained according to the correspondence between the capacitance value resulting from compensation and the weight. In this process, no additional external structure is needed for the touchscreen terminal, making the touchscreen terminal convenient to carry.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In the present invention, when a to-be-weighed object is placed in a preset area of a touchscreen, a gap between a housing and a capacitive screen of the touchscreen is distorted under a pressure, a capacitance value is changed due to the distortion, and reporting of coordinates of a touch point and reporting of the capacitance value are triggered. The touch point usually refers to a point at which a greatest distortion occurs. Objects of different weights cause different distortions when placed at a same point of the touchscreen. Therefore, magnitudes of reported capacitance values are different. Correspondences between capacitance values and weights are obtained by means of statistics. Therefore, a weight of the to-be-weighed object may be determined according to a magnitude of a capacitance value resulting when the to-be-weighed object is placed at a point. In this way, a weighing function is implemented.

As shapes and sizes of objects vary, when the objects are placed in the preset area of the touchscreen, the touch point may be any one of points in the preset area of the touchscreen. For a same object, when the object is placed at different positions of the touchscreen, the gap between the housing and the capacitive screen of the touchscreen may also have different degrees of distortions. For example, a distortion resulting when the touch point is at a center position of the touchscreen may be greater than that resulting when the touch point is near an edge of the touchscreen. Therefore, changes in capacitance values caused by the distortions are also different. To make the weighing function of the touchscreen terminal more widely applied and to reduce limitations on a shape and a size of an object, the present invention employs a compensation relationship for the touchscreen so that differences between capacitance values obtained after capacitance values corresponding to distortions at different points under a same pressure in the preset area of the touchscreen are compensated by using the compensation relationship fall within a preset error range. In this way, the weighing function of the touchscreen terminal can be more widely applied.

The present invention uses the foregoing method to implement a weighing function of a touchscreen terminal, and no additional external structure is needed for the touchscreen terminal. This makes the touchscreen terminal convenient to carry.

The following describes the technical solution of the present invention in detail by using specific embodiments. The following several specific embodiments may be mutually referenced, and same or similar concepts or processes may not be repeated in some embodiments.

Figure 1:
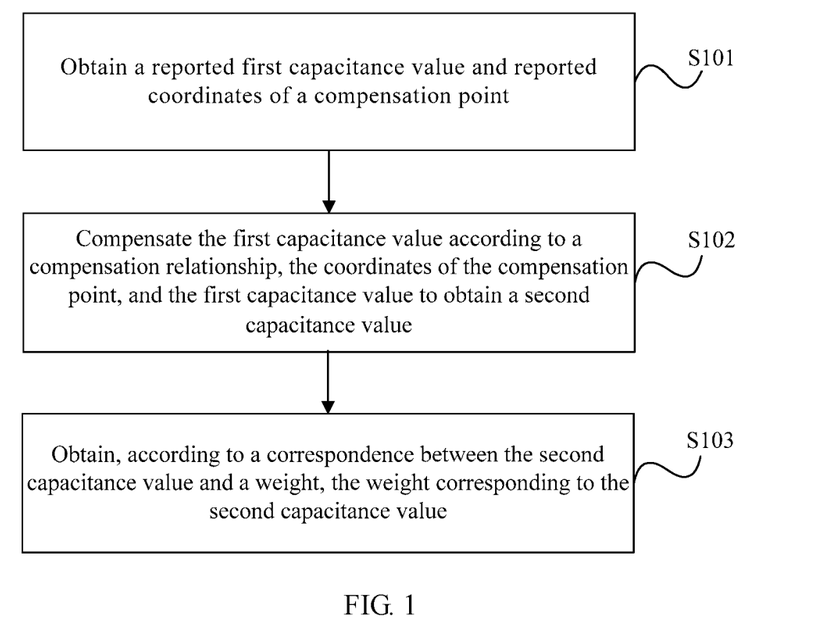
FIG. 1 is a schematic flowchart of Embodiment 1 of a weighing method of a touchscreen terminal according to the present invention.

FIG. 1 is a schematic flowchart of Embodiment 1 of a weighing method of a touchscreen terminal according to the present invention. The touchscreen terminal may be provided with a corresponding weighing function option. When the weighing function is used, the weighing function option is operated, for example, the weighing function of the touchscreen terminal is enabled by double-tapping the function option, or tapping the function option, or touching and holding the function option. Alternatively, the touchscreen terminal may not be provided with a corresponding function option. When an object is placed on the touchscreen, the weighing function is enabled by default to perform weighing directly. This is not limited in the present invention. When the touchscreen terminal is used for weighing, a user places a to-be-weighed object in a preset area of the touchscreen terminal. The preset area may be an entire screen of the touchscreen, or may be a partial area of the touchscreen, which is not limited in the present invention. The touchscreen terminal implements weighing of the to-be-weighed object in the following steps, as shown in FIG. 1.

S101: Obtain a reported first capacitance value and reported coordinates of a compensation point.

Some objects may be directly placed in the preset area of the touchscreen. In this case, to-be-weighed objects are the objects themselves. Some objects may be relatively small or inconvenient to be placed directly in the preset area of the touchscreen. In this case, the objects may be placed in a container, then the container is placed on the touchscreen, and to-be-weighed objects are the objects and the container.

As shapes of objects vary, the to-be-weighed object may touch the touchscreen at one, two, or more points.

When the to-be-weighed object is placed in the preset area of the touchscreen, a sensor of the touchscreen reports coordinate values of a touch point and a current capacitance value of a capacitive screen, and the current capacitance value of the capacitive screen is a first capacitance value.

When the to-be-weighed object touches the touchscreen at one point, the compensation point is the touch point.

When the to-be-weighed object touches the touchscreen at two points, the compensation point is a midpoint of a line segment connecting the two points.

When the to-be-weighed object touches the touchscreen at at least three points, the compensation point is a center of gravity of a graph enclosed by the at least three points.

A capacitance value at the compensation point after the to-be-weighed object causes a distortion between a housing and the capacitive screen of the touchscreen is obtained, and referred to as the first capacitance value.

S102: Compensate the first capacitance value according to a compensation relationship, the coordinates of the compensation point, and the first capacitance value to obtain a second capacitance value.

The compensation relationship may be a compensation function, a mapping relationship table, a database, or a combination of one or more of them. A specific form of the compensation relationship is not limited in the present invention.

The compensation relationship may be pre-configured in a processor of the touchscreen terminal or may be obtained by means of initial training in a process in which the weighing function of the touchscreen terminal is activated. This is not limited in the present invention. The compensation relationship only needs to satisfy that differences between capacitance values obtained after capacitance values at all points under a same pressure in the preset area of the touchscreen are compensated by using the compensation relationship fall within a preset error range.

The compensation relationship is related to a size of the touchscreen and a material of the touchscreen. Different compensation relationships may be used for touchscreens of different sizes or different materials.

The preset error range only needs to ensure that weight errors corresponding to capacitance value errors are in a tolerable range of user requirements. The preset error range is usually from 0 to 20% of a maximum value.

For example, if the maximum value is 100, remaining values range from 80 to 100, and the error range is from 1 to 20.

The first capacitance value is compensated by using the foregoing compensation relationship to obtain the second capacitance value.

That the compensation relationship is in a form of a compensation function is used as an example. It is assumed that the coordinates of the compensation point resulting from S101 are (x, y), that the first capacitance value is c1, and that the compensation function is $f(x, y, c1)=x^2/a^2+y^2/b^2+c1^2/c^2$, where a, b, and c are constants. Then, a compensation value corresponding to the compensation point is $f(x, y, c1)=x^2/a^2+y^2/b^2+c1^2/c^2$, and the second capacitance value is $c1+f(x, y, c1)$.

S103: Obtain, according to a correspondence between the second capacitance value and a weight, the weight corresponding to the second capacitance value.

This includes but is not limited to the following two implementation manners.

A first possible implementation manner is that the weight corresponding to the second capacitance value may be obtained directly according to the correspondence between the second capacitance value and the weight.

It is assumed that the correspondence between the second capacitance value and the weight is:

g(c2)=100c2, where c2 is the second capacitance value, and g(c2) is the weight corresponding to the second capacitance value.

The correspondence between the second capacitance value and the weight may be obtained from empirical values.

A second possible implementation manner is:

a pressure corresponding to the second capacitance value is obtained according to a correspondence between the second capacitance value and the pressure; and a weight corresponding to the pressure is obtained according to a correspondence between the pressure and the weight.

In this embodiment, when a to-be-weighed object is placed in a preset area of a touchscreen of a touchscreen terminal, a reported first capacitance value and reported coordinates of a compensation point are obtained; the first capacitance value is compensated according to a compensation relationship, the coordinates of the compensation point, and the first capacitance value to obtain a second capacitance value; and a weight corresponding to the second capacitance value is obtained according to a correspondence between the second capacitance value and the weight. When the to-be-weighed object is placed in the preset area of the touchscreen, the touchscreen is distorted, and specifically, a gap between a housing and a capacitive screen of the touchscreen is distorted, resulting in a change in the capacitance value at the compensation point of the touchscreen. The capacitance value of the touchscreen is compensated according to the compensation relationship, and the weight of the to-be-weighed object is obtained according to the correspondence between the capacitance value resulting from compensation and the weight. In this process, no additional external structure is needed for the touchscreen terminal, making the touchscreen terminal convenient to carry.

After the touchscreen terminal obtains the weight of the to-be-weighed object, the weight may be displayed on the touchscreen in a digital form, or may be announced by means of a voice announcement. This is not limited in the present invention.

Figure 2:
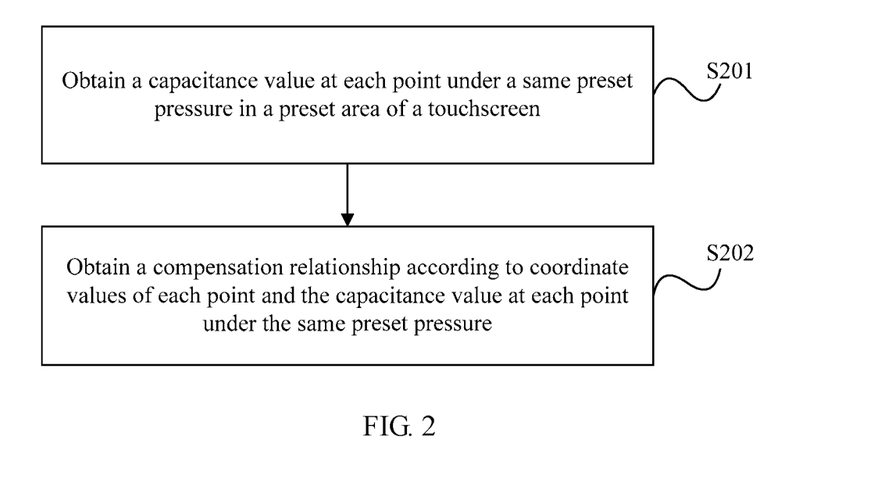
FIG. 2 is a schematic flowchart of an embodiment of obtaining a compensation relationship according to the present invention.

Before S102 of the embodiment shown in FIG. 1, obtaining the compensation relationship is further included. The compensation relationship may be obtained before the touchscreen terminal is delivered from the factory, where the compensation relationship is pre-configured directly in the touchscreen terminal; or may be obtained in an initialization process when the user activates the weighing function, after the touchscreen terminal is delivered from the factory. One possible implementation manner may be obtaining in the following manner, as shown in FIG. 2. FIG. 2 is a schematic flowchart of an embodiment of the obtaining the compensation relationship according to the present invention.

S201: Obtain a capacitance value at each point under a same preset pressure in the preset area of the touchscreen.

Figure 3:
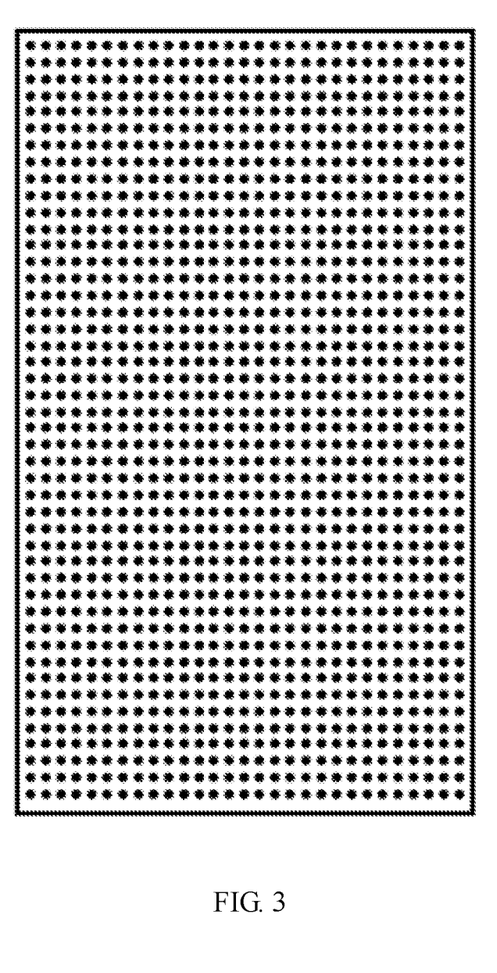
FIG. 3 is a schematic diagram of distribution of points on a touchscreen of a touchscreen terminal according to the present invention.

It is assumed that distribution of points on the touchscreen is shown in FIG. 3. FIG. 3 is a schematic diagram of the distribution of points on the touchscreen of the touchscreen terminal according to the present invention.

The preset area is selected from FIG. 3. Each point in the preset area is tapped with a fixed pressure P, and a capacitance value at each point is obtained as shown in Table 1, where x represents an x-axis, the first row of numbers represent coordinate values of the x-axis, y represents a y-axis, the first column of numbers represent coordinate values of the y-axis, and other numbers represent capacitance values at corresponding coordinate points under the pressure P.

TABLE 1

| Mass | X | | | | | | | | |
|---|---|---|---|---|---|---|---|---|---|
| No | 0 | 27 | 54 | 147 | 240 | 333 | 426 | 453 | 480 |
| Y  0 | 51 | 51 | 59 | 89 | 100 | 91 | 64 | 55 | 55 |
| 25 | 51 | 51 | 59 | 89 | 100 | 91 | 64 | 55 | 55 |
| 49 | 59 | 59 | 78 | 118 | 133 | 122 | 85 | 64 | 64 |
| 225 | 110 | 110 | 147 | 229 | 245 | 231 | 146 | 109 | 109 |
| 400 | 127 | 127 | 169 | 251 | 277 | 247 | 161 | 121 | 121 |
| 575 | 107 | 107 | 143 | 222 | 228 | 219 | 131 | 98 | 98 |
| 751 | 52 | 52 | 69 | 93 | 99 | 86 | 55 | 41 | 41 |
| 775 | 45 | 45 | 52 | 70 | 74 | 65 | 41 | 36 | 36 |
| 800 | 45 | 45 | 52 | 70 | 74 | 65 | 41 | 36 | 36 |

It can be seen from Table 1 that a point of coordinates (54, 49) has a capacitance value of 78 under the pressure P, and that a point of coordinates (240, 49) has a capacitance value of 133 under the pressure P. The same rule applies to other coordinate points, and enumeration is omitted herein.

S202: Obtain the compensation relationship according to coordinate values of each point and the capacitance value at each point under the same preset pressure.

It is assumed that compensation is made to other points with a central point used as a reference. Capacitance values at the points resulting from the compensation using the compensation relationship are shown in Table 2.

TABLE 2

| Mass | X | | | | | | | | |
|---|---|---|---|---|---|---|---|---|---|
| No | 275 | 276 | 276 | 276 | 276 | 276 | 276 | 276 | 275 |
| Y  0 | 276 | 276 | 276 | 276 | 276 | 276 | 276 | 276 | 276 |
| 25 | 276 | 276 | 276 | 277 | 277 | 277 | 276 | 276 | 276 |
| 49 | 276 | 276 | 276 | 277 | 277 | 277 | 276 | 276 | 276 |
| 225 | 276 | 277 | 276 | 277 | 277 | 277 | 276 | 276 | 276 |
| 400 | 276 | 276 | 276 | 277 | 277 | 277 | 276 | 276 | 276 |
| 575 | 276 | 276 | 276 | 277 | 277 | 277 | 276 | 276 | 276 |
| 751 | 276 | 276 | 276 | 277 | 277 | 277 | 276 | 276 | 276 |
| 775 | 276 | 276 | 276 | 276 | 276 | 276 | 276 | 276 | 276 |
| 800 | 275 | 276 | 276 | 276 | 276 | 276 | 276 | 276 | 275 |

It can be seen from Table 2 that differences between the capacitance values at the points fall within the preset error range.

In the embodiment shown in FIG. 2, a compensation relationship with respect to capacitance values is obtained. Alternatively, a compensation relationship with respect to pressure values may be obtained. This is similar to the method shown in FIG. 2, except that after S201, a pressure value corresponding to a first capacitance value at each point is obtained, and then, the compensation relationship is obtained according to coordinate values of each point and a pressure value corresponding to a capacitance value at each point under a same preset pressure. The compensation relationship only needs to satisfy that differences between pressure values obtained after pressure values at all points under a same pressure in the preset area of the touchscreen are compensated by using the compensation relationship fall within a preset error range.

In S103 of the embodiment shown in FIG. 1, when the second possible implementation manner is used, correspondences between pressures and weights are obtained in the following manner.

A pressure that is corresponding to a second capacitance value and that is reported when a weight-known object is placed in the preset area of the touchscreen is obtained. The correspondences between pressures and weights are determined according to pressures respectively corresponding to N different weight-known objects.

For example, when objects of 100 g, 150 g, 200 g, 250 g, 300 g, 350 g, 400 g, 450 g, 500 g, 550 g, 600 g, 650 g, 700 g, 750 g, and 800 g are placed in the preset area of the touchscreen, pressures corresponding to second capacitance values at the compensation point are shown in Table 3.

TABLE 3

| | Actual weight (g) | | | | | | | | | | | | | | |
|---|---|---|---|---|---|---|---|---|---|---|---|---|---|---|---|
| | 100 | 150 | 200 | 250 | 300 | 350 | 400 | 450 | 500 | 550 | 600 | 650 | 700 | 750 | 800 |
| Pressure value | 0.1 | 0.14 | 0.19 | 0.25 | 0.29 | 0.35 | 0.39 | 0.44 | 0.49 | 0.55 | 0.6 | 0.64 | 0.69 | 0.74 | 0.8 |

Figure 4:
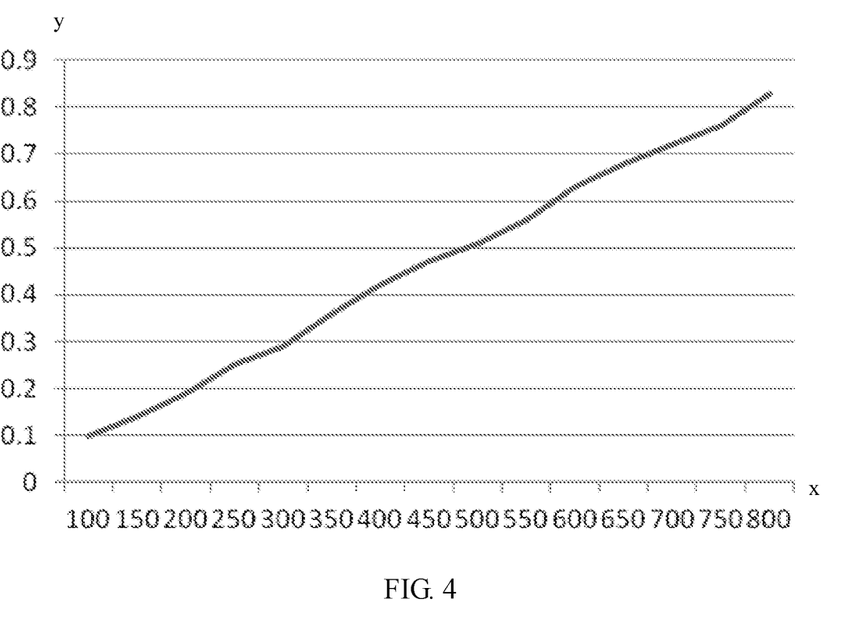
FIG. 4 is a schematic diagram of correspondences between pressures and weights according to the present invention.

As shown in FIG. 4, a curve f (y) is drawn according to Table 3, where an x-axis represents weights, and a y-axis represents pressures. It can be seen from FIG. 4 that f (y) is approximate to an oblique line. Therefore, f(y)≈1000y.

The correspondences between pressures and weights may be represented by f(y).

Figure 5:
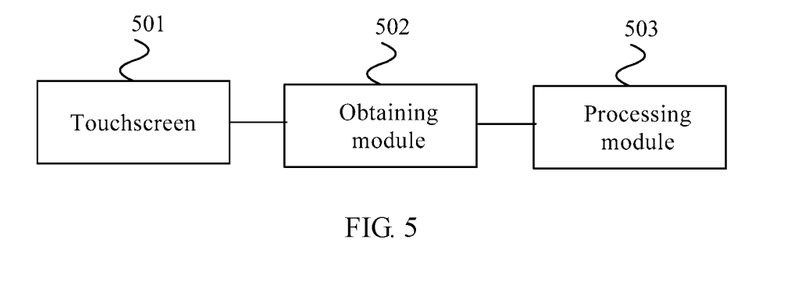
FIG. 5 is a schematic structural diagram of Embodiment 1 of a touchscreen terminal according to the present invention.

FIG. 5 is a schematic structural diagram of Embodiment 1 of a touchscreen terminal according to the present invention. The touchscreen terminal in this embodiment includes a touchscreen 501, an obtaining module 502, and a processing module 503. A preset area of the touchscreen 501 is configured for placing a to-be-weighed object. The obtaining module 502 is configured to obtain a reported first capacitance value and reported coordinates of a compensation point. The processing module 503 is configured to compensate the first capacitance value according to a compensation relationship, the coordinates of the compensation point, and the first capacitance value to obtain a second capacitance value, where the compensation relationship enables differences between capacitance values obtained after capacitance values at all points under a same pressure in the preset area of the touchscreen are compensated by using the compensation relationship to fall within a preset error range. The processing module 503 is further configured to obtain, according to a correspondence between the second capacitance value and a weight, the weight corresponding to the second capacitance value.

In the foregoing embodiment, when the to-be-weighed object touches the touchscreen at one point, the compensation point is the touch point.

When the to-be-weighed object touches the touchscreen at two points, the compensation point is a midpoint of a line segment connecting the two points.

When the to-be-weighed object touches the touchscreen at at least three points, the compensation point is a center of gravity of a graph enclosed by the at least three points.

In the foregoing embodiment, the obtaining module 502 is further configured to obtain a capacitance value at each point under a same preset pressure in the preset area of the touchscreen.

The processing module is further configured to obtain the compensation relationship according to coordinate values of each point and the capacitance value at each point under the same preset pressure.

In the foregoing embodiment, the processing module 503 is specifically configured to: obtain, according to a correspondence between the second capacitance value and a pressure, the pressure corresponding to the second capacitance value; and obtain, according to a correspondence between the pressure and a weight, the weight corresponding to the pressure.

In the foregoing embodiment, the processing module 503 is further configured to: obtain a pressure corresponding to a second capacitance value at a compensation point when a weight-known object is placed in the preset area of the touchscreen; and determine correspondences between pressures and weights according to pressures respectively corresponding to N different weight-known objects.

In the foregoing embodiment, the preset error range is from 0 to 20% of a maximum value.

The apparatus in this embodiment may be configured to implement the technical solution of the method embodiment shown in FIG. 1. The implementation principles and technical effects are similar and are not further described herein.

Figure 6:
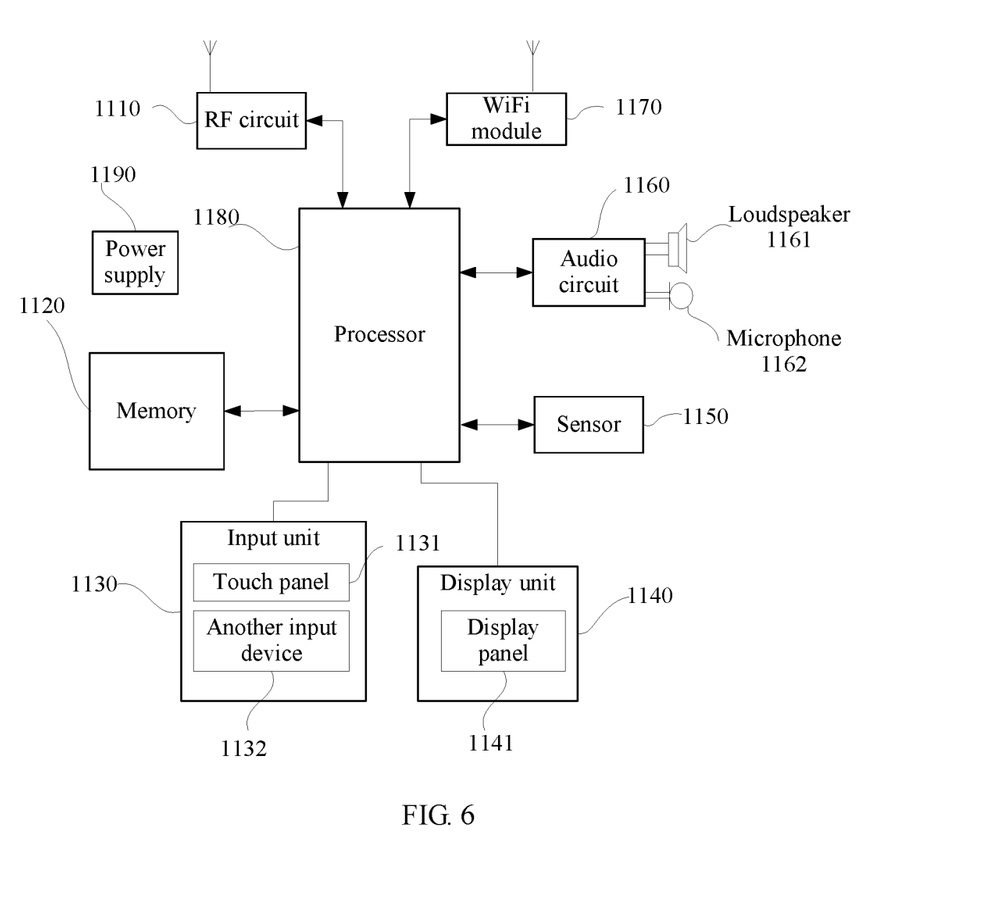
FIG. 6 is a schematic structural diagram of Embodiment 2 of a touchscreen terminal according to the present invention.

FIG. 6 is a schematic structural diagram of Embodiment 2 of a touchscreen terminal according to the present invention. A mobile phone is used as an example of the touchscreen terminal in this embodiment. Specifics about components of the mobile phone are described below with reference to FIG. 6.

An RF circuit 1110 may be configured to send or receive information, or send or receive a signal during a call, and in particular, receive downlink information from a base station for a processor 1180 to process, and send uplink data of the mobile phone to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 1110 may also communicate with a network and another device by means of wireless communication. For the wireless communication, any communications standard or protocol may be used, including but not limited to the Global System for Mobile Communications (Global System for Mobile communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, Short Messaging Service (Short Messaging Service, SMS), and the like.

A memory 1120 may be configured to store a software program and a software module. By running the software program and the software module that are stored in the memory 1120, the processor 1180 implements various functional applications and data processing of the mobile phone. The memory 1120 may mainly include a program storage area and a data storage area. The program storage area may store an operating system, an application program required by at least one function (for example, an audio playback function and an image playback function), and the like. The data storage area may store data (for example, audio data and a phone book) created according to use of the mobile phone, and the like. In addition, the memory 1120 may include a high-speed random access memory, and may further include a non-volatile memory, for example, at least one disk storage device, a flash memory device, or another volatile solid-state storage device.

An input unit 1130 may be configured to receive input digit or character information and generate key signal input related to user setting and function control of the mobile phone. Specifically, the input unit 1130 may include a touch panel 1131 and another input device 1132. The touch panel 1131, also referred to as a touchscreen, may collect a touch operation performed by a user on or in the vicinity of the touch panel 1131 (for example, an operation performed on the touch panel 1131 or in the vicinity of the touch panel 1131 by the user by using a finger, a stylus, or any other suitable object or accessory). The touch panel 1131 may include:

two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into touch point coordinates, and then sends the touch point coordinates to the processor 1180, and can receive and execute a command sent by the processor 1180. In addition, various types such as resistive, capacitive, infrared, and surface acoustic wave may be used to implement the touch panel 1131. In addition to the touch panel 1131, the input unit 1130 may further include the another input device 1132. Specifically, the another input device 1132 may include but is not limited to one or more of a physical keyboard, a function button (for example, a volume control button or a power button), a trackball, a mouse, an operating lever, or the like.

A display unit 1140 may be configured to display information entered by the user, information provided for the user, and various menus of the mobile phone. The display unit 1140 may include a display panel 1141. Optionally, the display panel 1141 may be configured in a form of a liquid crystal display (Liquid Crystal Display, LCD), an organic light-emitting diode (Organic Light-Emitting Diode, OLED), or the like. Further, the touch panel 1131 may cover the display panel 1141. After detecting a touch operation on or in the vicinity of the touch panel 1131, the touch panel 1131 transfers the touch operation to the processor 1180 to determine a type of the touch event. Then, the processor 1180 provides corresponding visual output on the display panel 1141 according to the type of the touch event. In FIG. 6, the touch panel 1131 and the display panel 1141 act as two independent parts to implement input and output functions of the mobile phone. In some embodiments, however, the touch panel 1131 and the display panel 1141 may be integrated to implement the input and output functions of the mobile phone.

The mobile phone may further include at least one sensor 1150 such as a light sensor, a motion sensor, or another sensor. Specifically, the light sensor may include an ambient light sensor and a proximity sensor. The ambient light sensor may adjust luminance of the display panel 1141 according to brightness of ambient light. The proximity sensor may turn off the display panel 1141 and/or backlight when the mobile phone moves close to an ear. As a type of motion sensor, an accelerometer sensor may detect accelerations in various directions (three axes in general), detect, in a still state, a magnitude and a direction of gravity, and be applied to a mobile phone posture recognition application (for example, screen switching between landscape orientation and vertical orientation, a related game, and magnetometer posture calibration), a vibration recognition related function (for example, a pedometer or stroking), and the like. Other sensors, such as a gyroscope, a barometer, a hygrometer, a thermometer, and an infrared sensor, that may further be configured in the mobile phone are not described herein.

An audio circuit 1160, a loudspeaker 1161, and a microphone 1162 may provide an audio interface between the user and the mobile phone. The audio circuit 1160 may transmit, to the loudspeaker 1161, an electrical signal that is obtained after conversion of received audio data, and the loudspeaker 1161 converts the electrical signal into an acoustic signal and outputs the acoustic signal. In another aspect, the microphone 1162 converts a collected acoustic signal into an electrical signal; the audio circuit 1160 receives the electrical signal and converts the electrical signal into audio data, and outputs the audio data to the processor 1180 for processing; and processed audio data is sent to, for example, another mobile phone via the RF circuit 1110, or the audio data is output to the memory 1120 for further processing.

Wi-Fi is a short-distance wireless transmission technology. By using a Wi-Fi module 1170, the mobile phone may help the user to send or receive an email, browse a web page, access streaming media, and the like. The Wi-Fi module 1170 provides wireless broadband Internet access for the user. Although FIG. 6 shows the Wi-Fi module 1170, it can be understood that the Wi-Fi module 1170 is not a necessary constituent of the mobile phone and may be omitted well as required provided that the essence of the present invention is not changed.

The processor 1180, as a control center of the mobile phone, connects various parts of the mobile phone by using various interfaces and circuits, and executes various functions and data processing of the mobile phone by running or executing a software program and/or module stored in the memory 1120 and calling data stored in the memory 1120, so as to monitor the entire mobile phone. Optionally, the processor 1180 may include one or more processing units. Preferably, the processor 1180 may integrate an application processor and a modem processor. The application processor mainly provides processing related to the operating system, a user interface, an application program, and the like, and the modem processor mainly processes wireless communication. It can be understood that the foregoing modem processor may alternatively not be integrated into the processor 1180.

The mobile phone further includes a power supply 1190 (for example, a battery) supplying power to all components. Preferably, the power supply may be logically connected to the processor 1180 via a power management system. In this way, functions such as charge and discharge management and power consumption management are implemented by using the power management system.

Although not shown, the mobile phone may further include a camera, a Bluetooth module, and the like, and details are not described herein.

In this embodiment of the present invention, the processor 1180 included in the terminal device further has a function of: obtaining a first capacitance value at a compensation point; compensating the first capacitance value according to a compensation relationship to obtain a second capacitance value, where the compensation relationship enables differences between capacitance values obtained after capacitance values at all points under a same pressure in a preset area of the touchscreen are compensated by using the compensation relationship to fall within a preset error range; and obtaining, according to a correspondence between the second capacitance value and a weight, the weight corresponding to the second capacitance value.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A weighing method of a touchscreen terminal, when a to-be-weighed object is placed in an area of a touchscreen of the touchscreen terminal, comprising:
    obtaining a capacitance value at each grid point of all grid points in the area of the touchscreen under a same pressure in the area of the touchscreen;
    obtaining a compensation relationship according to coordinates of each grid point and a capacitance value at each grid point of the all grid points in the area of the touchscreen under the same pressure;
    obtaining a first capacitance value and coordinates of a compensation point;
        obtaining a second capacitance value by compensating the first capacitance value according to the compensation relationship, the coordinates of the compensation point, and the first capacitance value,
            wherein, under the compensation relationship, differences between compensated capacitance values at the all grid points in the area of the touchscreen under the same pressure fall within a preset error range, and
            wherein the compensated capacitance values are obtained after applying the compensation relationship to reported capacitance values at the all grid points in the area of the touchscreen, respectively; and
    obtaining, according to a correspondence between the second capacitance value and a weight, the weight corresponding to the second capacitance value.

2. The method according to claim 1, wherein if the to-be-weighed object touches the touchscreen at one point, the compensation point is the touch point;
    if the to-be-weighed object touches the touchscreen at two points, the compensation point is a midpoint of a line segment connecting the two points; and
    if the to-be-weighed object touches the touchscreen at at least three points, the compensation point is a center of gravity of a graph formed by lines connecting the at least three points.

3. The method according to claim 2, wherein the obtaining, according to a correspondence between the second capacitance value and a weight, the weight corresponding to the second capacitance value comprises:
    obtaining, according to a correspondence between the second capacitance value and a pressure, the pressure corresponding to the second capacitance value; and
    obtaining, according to a correspondence between the pressure and a weight, the weight corresponding to the pressure.

4. The method according to claim 2, wherein the preset error range is from 0 to 20% of a maximum value of reported capacitance values at the all grid points in the area of the touchscreen under the same pressure.

5. The method according to claim 1, before the compensating the first capacitance value according to a compensation relationship, the coordinates of the compensation point, and the first capacitance value to obtain a second capacitance value, further comprising:
    obtaining a capacitance value at each grid point of the all grid points in the area of the touchscreen under the same pressure; and
    obtaining the compensation relationship according to coordinates of each grid point and the capacitance value at the each grid point of the all grid points in the area of the touchscreen under the same pressure.

6. The method according to claim 5, wherein the obtaining, according to a correspondence between the second capacitance value and a weight, the weight corresponding to the second capacitance value comprises:
    obtaining, according to a correspondence between the second capacitance value and a pressure, the pressure corresponding to the second capacitance value; and
    obtaining, according to a correspondence between the pressure and a weight, the weight corresponding to the pressure.

7. The method according to claim 1, wherein the obtaining, according to a correspondence between the second capacitance value and a weight, the weight corresponding to the second capacitance value comprises:
    obtaining, according to a correspondence between the second capacitance value and a pressure, the pressure corresponding to the second capacitance value; and
    obtaining, according to a correspondence between the pressure and a weight, the weight corresponding to the pressure.

8. The method according to claim 7, before the obtaining, according to a correspondence between the pressure and a weight, the weight corresponding to the pressure, further comprising:
    obtaining a pressure that is corresponding to a third capacitance value in response to a weight-known object being placed in the area of the touchscreen; and
    determining correspondences between pressures and weights according to pressures respectively corresponding to different weight-known objects.

9. The method according to claim 1, wherein the preset error range is from 0 to 20% of a maximum value of reported capacitance values at the all grid points in the area of the touchscreen under the same pressure.

10. A touchscreen terminal, comprising:
    a touchscreen, wherein an area of the touchscreen is configured to receive a placement of a to-be-weighed object;
    at least one processor; and
    a memory coupled to the at least one processor and storing programming instructions for execution by the at least one processor, the programming instructions instruct the at least one processor to:
    obtain a capacitance value at each grid point of all grid points in the area of the touchscreen under a same pressure in the area of the touchscreen;
    obtain a compensation relationship according to coordinates of each grid point and a capacitance value at each grid point of the all grid points in the area of the touchscreen under the same pressure;

obtain a first capacitance value and coordinates of a compensation point;

obtain a second capacitance value by compensating the first capacitance value according to the compensation relationship, the coordinates of the compensation point, and the first capacitance value to obtain a second capacitance value, wherein, under the compensation relationship, differences between compensated capacitance values at the all grid points in the area of the touchscreen under the same pressure fall within a preset error range, wherein the compensated capacitance value are obtained after applying the compensation relationship to reported capacitance values at the all grid points in the area of the touchscreen, respectively; and obtain, according to a correspondence between the second capacitance value and a weight, the weight corresponding to the second capacitance value.

11. The touchscreen terminal according to claim 10, wherein if the to-be-weighed object touches the touchscreen at one point, the compensation point is the touch point;

if the to-be-weighed object touches the touchscreen at two points, the compensation point is a midpoint of a line segment connecting the two points; and if the to-be-weighed object touches the touchscreen at least three points, the compensation point is a center of gravity of a graph enclosed by the at least three points.

12. The touchscreen terminal according to claim 11, wherein the programming instructions further instruct the at least one processor to:

obtain, according to a correspondence between the second capacitance value and a pressure, the pressure corresponding to the second capacitance value; and obtain, according to a correspondence between the pressure and a weight, the weight corresponding to the pressure.

13. The touchscreen terminal according to claim 10, wherein the programming instructions further instruct the at least one processor to:

obtain, according to a correspondence between the second capacitance value and a pressure, the pressure corresponding to the second capacitance value; and obtain, according to a correspondence between the pressure and a weight, the weight corresponding to the pressure.

14. The touchscreen terminal according to claim 13, wherein the programming instructions further instruct the at least one processor to:

obtain a pressure that is corresponding to a third capacitance value and that is reported when a weight-known object is placed in the area of the touchscreen; and determine correspondences between pressures and weights according to pressures respectively corresponding to different weight-known objects.

15. The touchscreen terminal according to claim 10, wherein the error range is from 0 to 20% of a maximum value of reported capacitance values at the all grid points in the area of the touchscreen under the same pressure.

16. The touchscreen terminal according to claim 10, wherein the programming instructions further instruct the at least one processor to:

obtain, according to a correspondence between the second capacitance value and a pressure, the pressure corresponding to the second capacitance value; and obtain, according to a correspondence between the pressure and a weight, the weight corresponding to the pressure.

17. A non-transitory computer-readable storage medium that stores one or more programs, wherein the one or more programs comprise an instruction, when an electronic device that comprises a display and one or more application programs executes the instruction, the electronic device is enabled to perform the method according to claim 1, and the display comprises a display screen.

* * * * *